(12) United States Patent
Kuroda et al.

(10) Patent No.: US 9,415,246 B2
(45) Date of Patent: Aug. 16, 2016

(54) LAYERED HEAT-PROOF PROTECTIVE CLOTHING

(75) Inventors: Saori Kuroda, Ibaraki (JP); Akimoto Uchikawa, Ibaraki (JP)

(73) Assignee: TEIJIN LIMITED, Osaka (JP)

(*) Notice: Subject to any disclaimer, the term of this patent is extended or adjusted under 35 U.S.C. 154(b) by 649 days.

(21) Appl. No.: 13/824,163

(22) PCT Filed: Oct. 17, 2011

(86) PCT No.: PCT/JP2011/073775
§ 371 (c)(1),
(2), (4) Date: Mar. 15, 2013

(87) PCT Pub. No.: WO2012/053460
PCT Pub. Date: Apr. 26, 2012

(65) Prior Publication Data
US 2013/0174334 A1    Jul. 11, 2013

(30) Foreign Application Priority Data

Oct. 20, 2010   (JP) ................... 2010-235580

(51) Int. Cl.
*A41D 31/02*       (2006.01)
*A41D 13/00*       (2006.01)
(Continued)

(52) U.S. Cl.
CPC ............ *A62B 17/00* (2013.01); *A41D 31/0027* (2013.01); *D03D 1/0035* (2013.01);
(Continued)

(58) Field of Classification Search
CPC .......... A41D 31/0027; A41D 2400/22; A41D 31/0038; A41D 31/02; A41D 27/04; A41D 31/0016; A41D 13/00; A41D 31/0022; A41D 13/0002; A41D 27/02; A41D 2400/20; A41D 19/01529; A41D 31/0083; A41D 13/02; A41D 3/02; A41D 19/001; A41D 2200/20; A41D 2400/10; A41D 31/0011; A41D 31/0061; A41D 3/00; A41D 13/0012; A41D 31/0055; A41D 19/0006; A41D 2500/00; A41D 2500/20; A41D 31/00; A41D 31/0072; A62B 17/003; A62B 17/006; A62B 17/00; A62B 17/005; A62B 17/04; A62B 5/00; A62D 5/00; D03D 15/12; D03D 1/0035; D03D 13/004; D03D 15/00; D03D 13/008; D03D 1/0041

See application file for complete search history.

(56) References Cited

U.S. PATENT DOCUMENTS 3,849,178 A * 11/1974 Feldman ................... 428/446
4,008,345 A *  2/1977 Imanaka et al. ........... 427/381
(Continued)

FOREIGN PATENT DOCUMENTS

CN    1578632 A      2/2005
JP    2002-115106 A  4/2002
(Continued)

OTHER PUBLICATIONS

Shobo Bokafuku no Kaiteki Seino, Kino Seino no Hyoka ni Kansuru Kenkyu Hokokusho, Shobo Kenkyusho Kenkyu Shiryo, No. 64, Dokuritsu Gyosei Hojin Shobo Kenkyusho, Jun. 2004, pp. 27-32, ISBN 88391-064-4.
(Continued)

*Primary Examiner* — Bobby Muromoto, Jr.
(74) *Attorney, Agent, or Firm* — Sughrue Mion, PLLC

(57) ABSTRACT

Layered heat-proof protective clothing includes a front fabric layer and a breathable waterproof interlayer and/or heat-shielding layer, the layered heat-proof protective clothing having a thickness of 2.5 mm or greater after 5 washings according to ISO 6330, and a time to temperature increase by 24° C. of 18 seconds or longer in the heat transfer test ISO 6942-2002 in European Approach A, Section 4, according to ISO 11613, wherein the basis weight of the layered heat-proof protective clothing is 450±50 g/m², and wherein the front fabric layer is composed of a double weave fabric, having a front side fabric and back side fabric whose TMA shrinkage factor difference at 400° C., with 150° C/min increase, is at least 4%, and the variation in thickness of the double weave fabric after 8 seconds of flame exposure from the front side fabric side following ISO 17492, TPP, being 2 mm or greater.

12 Claims, 12 Drawing Sheets

(51) Int. Cl.
*A41D 31/00* (2006.01)
*A62B 17/00* (2006.01)
*D03D 1/00* (2006.01)
*D03D 11/02* (2006.01)
*D03D 13/00* (2006.01)
*D03D 15/00* (2006.01)
*D03D 15/04* (2006.01)
*D03D 15/12* (2006.01)

(52) U.S. Cl.
CPC .............. *D03D1/0041* (2013.01); *D03D 11/02* (2013.01); *D03D 13/004* (2013.01); *D03D 13/008* (2013.01); *D03D 15/0027* (2013.01); *D03D 15/04* (2013.01); *D03D 15/12* (2013.01); *A62B 17/003* (2013.01); *B32B 2307/306* (2013.01); *B32B 2307/3065* (2013.01); *B32B 2307/7265* (2013.01); *B32B 2437/00* (2013.01); *D10B 2101/12* (2013.01); *D10B 2201/02* (2013.01); *D10B 2201/24* (2013.01); *D10B 2211/02* (2013.01); *D10B 2331/021* (2013.01); *D10B 2331/04* (2013.01); *D10B 2331/14* (2013.01); *D10B 2331/301* (2013.01); *D10B 2501/04* (2013.01)

(56) References Cited

U.S. PATENT DOCUMENTS

| | | | | |
|---|---|---|---|---|
| 4,302,496 A * | 11/1981 | Donovan | | 428/196 |
| 4,469,744 A * | 9/1984 | Grot et al. | | 442/88 |
| 4,500,592 A * | 2/1985 | Lee et al. | | 442/230 |
| 4,849,280 A * | 7/1989 | Coombs | | 442/247 |
| 4,872,220 A * | 10/1989 | Haruvy et al. | | 2/243.1 |
| 4,937,136 A * | 6/1990 | Coombs | | 442/247 |
| 4,943,475 A * | 7/1990 | Baker et al. | | 442/71 |
| 5,024,594 A * | 6/1991 | Athayde et al. | | 442/67 |
| 5,098,770 A * | 3/1992 | Paire | | 428/198 |
| 5,136,723 A * | 8/1992 | Aldridge et al. | | 2/81 |
| 5,162,398 A * | 11/1992 | Katz | | 523/222 |
| 5,323,815 A * | 6/1994 | Barbeau et al. | | 139/420 A |
| 5,491,022 A * | 2/1996 | Smith | | 442/50 |
| 5,499,663 A * | 3/1996 | Barbeau et al. | | 139/420 A |
| 5,539,928 A * | 7/1996 | Aldridge | | 2/93 |
| 5,598,582 A * | 2/1997 | Andrews et al. | | 2/16 |
| 5,624,738 A * | 4/1997 | Barbeau et al. | | 428/198 |
| 5,640,718 A * | 6/1997 | Aldridge | | 2/81 |
| 5,685,015 A * | 11/1997 | Aldridge | | 2/81 |
| 5,691,040 A * | 11/1997 | Barbeau et al. | | 428/198 |
| 5,697,101 A * | 12/1997 | Aldridge | | 2/81 |
| 5,720,045 A * | 2/1998 | Aldridge | | 2/81 |
| 5,722,482 A * | 3/1998 | Buckley | | 165/10 |
| 5,724,673 A * | 3/1998 | Aldridge | | 2/81 |
| 5,787,502 A * | 8/1998 | Middleton | | 2/69 |
| 5,789,025 A * | 8/1998 | St. Clair | | 427/245 |
| 5,860,163 A * | 1/1999 | Aldridge | | 2/81 |
| 5,887,453 A * | 3/1999 | Woods | | 66/171 |
| 5,896,583 A * | 4/1999 | Grilliot et al. | | 2/81 |
| 5,920,905 A * | 7/1999 | Aldridge | | 2/81 |
| 5,924,134 A * | 7/1999 | Taylor et al. | | 2/81 |
| 5,935,882 A | 8/1999 | Fujita et al. | | 442/247 |
| 5,983,409 A * | 11/1999 | Aldridge et al. | | 2/458 |
| 5,996,122 A * | 12/1999 | Aldridge et al. | | 2/81 |
| 6,017,637 A * | 1/2000 | St. Clair | | 428/447 |
| 6,065,153 A * | 5/2000 | Underwood et al. | | 2/93 |
| 6,192,520 B1 * | 2/2001 | Underwood et al. | | 2/93 |
| 6,397,401 B2 * | 6/2002 | Belcher | | 2/458 |
| 6,427,242 B1 * | 8/2002 | Bush et al. | | 2/69 |
| 6,430,754 B1 * | 8/2002 | Taylor et al. | | 2/458 |
| 6,531,419 B1 * | 3/2003 | Wyner et al. | | 442/136 |
| 6,687,913 B2 * | 2/2004 | Aldridge | | 2/81 |
| 6,723,378 B2 * | 4/2004 | Hrubesh et al. | | 427/180 |
| 6,800,367 B2 * | 10/2004 | Hanyon et al. | | 428/364 |
| 6,800,573 B2 * | 10/2004 | Van De Ven et al. | | 442/377 |
| 6,869,900 B2 * | 3/2005 | Wyner et al. | | 442/136 |
| 6,886,184 B2 * | 5/2005 | Underwood et al. | | 2/82 |
| 6,978,480 B2 * | 12/2005 | Grilliot et al. | | 2/81 |
| 6,983,490 B1 * | 1/2006 | Lewis et al. | | 2/97 |
| 2004/0266293 A1 | 12/2004 | Thiriot | | |
| 2006/0035549 A1 * | 2/2006 | Honna | | 442/88 |
| 2008/0095998 A1 | 4/2008 | Thiriot | | |
| 2008/0189840 A1 | 8/2008 | Knoff et al. | | |
| 2009/0137176 A1 * | 5/2009 | Okuya et al. | | 442/189 |
| 2010/0138983 A1 | 6/2010 | Kim | | |
| 2012/0110721 A1 * | 5/2012 | Takahashi et al. | | 2/458 |
| 2012/0114883 A1 * | 5/2012 | Kapur et al. | | 428/34.1 |
| 2012/0122361 A1 * | 5/2012 | Hand et al. | | 442/79 |
| 2012/0171409 A1 * | 7/2012 | Todt et al. | | 428/90 |
| 2012/0260422 A1 * | 10/2012 | Rock et al. | | 5/483 |
| 2012/0276332 A1 * | 11/2012 | Conolly et al. | | 428/138 |
| 2013/0004747 A1 * | 1/2013 | Schwarz et al. | | 428/196 |
| 2013/0115842 A1 * | 5/2013 | Squires et al. | | 442/370 |
| 2013/0174334 A1 * | 7/2013 | Kuroda et al. | | 2/455 |
| 2013/0205481 A1 * | 8/2013 | Underwood et al. | | 2/455 |
| 2013/0212790 A1 * | 8/2013 | Waxman et al. | | 2/458 |
| 2013/0254980 A1 * | 10/2013 | Underwood et al. | | 2/458 |
| 2014/0004295 A1 * | 1/2014 | Kiederle | | 428/101 |
| 2014/0030468 A1 * | 1/2014 | Kiederle et al. | | 428/69 |
| 2014/0087104 A1 * | 3/2014 | Kierderle et al. | | 428/35.2 |
| 2014/0115783 A1 * | 5/2014 | Rock et al. | | 5/502 |
| 2014/0215697 A1 * | 8/2014 | Lewis et al. | | 2/458 |
| 2014/0234592 A1 * | 8/2014 | Ruediger et al. | | 428/196 |
| 2014/0259255 A1 * | 9/2014 | Ragan | | 2/16 |
| 2014/0259328 A1 * | 9/2014 | Maples et al. | | 2/455 |
| 2014/0360619 A1 * | 12/2014 | Underwood et al. | | 139/384 R |
| 2015/0104604 A1 * | 4/2015 | Rock et al. | | 428/86 |

FOREIGN PATENT DOCUMENTS

| | | |
|---|---|---|
| JP | 2004-197234 A | 7/2004 |
| JP | 2006-016709 A | 1/2006 |
| JP | 2008-524467 A | 7/2008 |
| JP | 2009-280942 A | 12/2009 |
| JP | 2010-517826 A | 5/2010 |
| JP | 2010-255124 A | 11/2010 |
| WO | 2007/018082 A1 | 2/2007 |

OTHER PUBLICATIONS

Partial English translation of Shobo Bokafuku no Kaiteki Seino, Kino Seino no Hyoka ni Kansuru Kenkyu Hokokusho, Shobo Kenkyusho Kenkyu Shiryo, No. 64, Dokuritsu Gyosei Hojin Shobo Kenkyusho, Jun. 2004, pp. 27-32, ISBN 88391-064-4.

Communication dated Aug. 27, 2015 from the European Patent Office in counterpart application No. 11834299.7.

* cited by examiner

LAYERED HEAT-PROOF PROTECTIVE CLOTHING

CROSS REFERENCE TO RELATED APPLICATIONS

This application is a National Stage International Application No. PCT/JP2011/073775 filed Oct. 17, 2011, the contents of which are incorporated herein by reference in their entirety.

TECHNICAL FIELD

The present invention relates to layered heat-proof protective clothing, and more specifically it relates to heat-proof protective clothing having a layered structure with not only excellent chemical resistance and breathable waterproofness, but also a high heat-insulating property, lightweight properties, and flexibility.

BACKGROUND ART

The fibers used to compose heat-proof protective wear worn by firemen during extinguishing operations have conventionally been noncombustible asbestos fiber, glass fiber and the like, but heat-proof flame retardant organic fibers such as aramid fibers, polyphenylene sulfide fibers, polyimide fibers, polybenzimidazole fibers and polybenzoxazole fibers have come to be most commonly used in recent years because of environmental problems, and for greater mobility.

In order to prevent radiant heat into fabrics as well, many products are surface-treated by coating, vapor deposition, sputtering or plating of metallic aluminum or the like, and these are used as front fabric layers. Heat-insulating properties against radiant heat have been improved considerably by such methods.

In recent years, especially, as preventing radiant heat has become an extremely important specification, Approach A of ISO 11613 assigns specifications of at least 13 seconds and at least 18 seconds for a flame exposure test (ISO 9151) and a radiant heat exposure test (ISO 6942-2002), respectively.

Furthermore, in order not only to provide heat resistance but also to prevent heat stroke by heat stress during work activities in the summer season, methods used in recent years have included those that employ ice packs in inner layers, and ensuring air permeability by sewing. Lightweightness is another means of reducing heat stress that has become an issue of interest in recent years.

Such heat-proof protective wear includes protective wear with a two-layer structure as disclosed in Japanese Unexamined Patent Publication No. 2006-16709, and front fabric layers composed of differential-shrinkage spun yarn, as disclosed in Japanese Unexamined Patent Publication No. 2009-280942, but the necessary performance has often been inadequate, or sufficient lightweightness has not been achieved, and as a result the heat-proof protective clothing has not been fully satisfactory.

CITATION LIST

Patent Literature

[Patent document 1] Japanese Unexamined Patent Publication No. 2006-16709
[Patent document 2] Japanese Unexamined Patent Publication No. 2009-280942

DISCLOSURE OF THE INVENTION

Problems to be Solved by the Invention

It is an object of the invention to solve the aforementioned problems of the prior art by providing layered heat-proof protective clothing that not only has excellent heat-proof chemical resistance and breathable waterproofness, but is also lightweight and has a high heat-insulating property, meeting the specifications of lightweightness, and the flame exposure test (ISO 9151) and radiant heat exposure test (ISO 6942-2002) of Approach A and B of ISO 11613.

Means for Solving the Problems

As a result of much diligent research on these problems, the present inventors have solved them by the layered heat-proof protective clothing described below, and have thereupon completed this invention.

Specifically, the invention provides layered heat-proof protective clothing comprising a front fabric layer, and a breathable waterproof interlayer and/or heat-shielding layer, the layered heat-proof protective clothing having a thickness of 2.5 mm or greater after 5 washings according to ISO 6330, and a time to temperature increase by 24° C. (RHTI24) of 18 seconds or longer in a heat transfer (radiant heat exposure) test (ISO 6942-2002) in European Approach A (Section 4) according to ISO 11613.

Effect of the Invention

The layered heat-proof protective clothing of the invention not only has excellent heat-proof chemical resistance and breathable waterproofness, but is also lightweight and has a high heat-insulating property, meeting the specifications of the flame exposure test (ISO 9151) and radiant heat exposure test (ISO 6942-2002) of Approach A and B of ISO 11613, and can therefore be used as layered heat-proof protective clothing with low heat stress.

BRIEF DESCRIPTION OF THE DRAWINGS

FIG. 5-1 is a weave diagram showing another example of a woven fabric composing the heat-shielding layer of layered heat-proof protective clothing according to the invention.

FIG. 5-2 is a weave diagram showing another example of a woven fabric composing the heat-shielding layer of layered heat-proof protective clothing according to the invention.

FIG. 5-3 is a weave diagram showing another example of a woven fabric composing the heat-shielding layer of layered heat-proof protective clothing according to the invention.

FIG. 5-4 is a weave diagram showing another example of a woven fabric composing the heat-shielding layer of layered heat-proof protective clothing according to the invention.

FIG. 5-5 is a weave diagram showing another example of a woven fabric composing the heat-shielding layer of layered heat-proof protective clothing according to the invention.

FIG. 5-6 is a weave diagram showing another example of a woven fabric composing the heat-shielding layer of layered heat-proof protective clothing according to the invention.

FIG. 5-7 is a weave diagram showing another example of a woven fabric composing the heat-shielding layer of layered heat-proof protective clothing according to the invention.

FIG. 5-8 is a weave diagram showing another example of a woven fabric composing the heat-shielding layer of layered heat-proof protective clothing according to the invention.

FIG. 6 is a schematic cross-sectional view showing shape deformation before and after flame exposure, for layered heat-proof protective clothing according to the invention.

BEST MODE FOR CARRYING OUT THE INVENTION

Embodiments of the invention will now be explained in detail.

The layered heat-proof protective clothing of the invention is composed of a front fabric layer, and a breathable waterproof interlayer and/or heat-shielding layer, and it may be used as a union woven or knitted fabric with the front fabric layer, interlayer and heat-shielding layer all consisting of para-aramid fibers or meta-aramid fibers alone, or as blended or combined filaments, such other blendable or combinable filaments including polyphenylene sulfide fibers, polyimide fibers, polybenzimidazole fibers, polybenzoxazole fibers, polyamideimide fibers, polyetherimide fibers, polyetherimide fibers or flame-retardant acrylic fibers, with polychlal fibers, flame-retardant polyester fibers, flame-retardant cotton fibers, flame-retardant rayon fibers, flame-retardant vinylon fibers, flame-retardant wool fibers, Pyromex, carbon fibers and the like. However, so long as flame retardance of the fabric can be satisfied, there is no problem with blending, combining or union weaving or knitting of highly flammable fibers.

Also, the para-aramid fibers are preferably fibers composed of polyamide which has aromatic rings in the main chain, and it may be poly-p-phenylene terephthalamide (PPTA), or copolymerization-type copolyparaphenylene-3,4'-oxydiphenylene terephthalamide (PPODPA).

In particular, the front fabric layer must have properties such as heat-proofness, flame retardance, cut resistance, high strength and high tensile strength, and it is formed using meta-aramid fibers and para-aramid fibers and some antistatic fibers although there is no limitation to these, while the fabric form may be a knitted or woven fabric or a nonwoven fabric, with woven fabrics being preferred in practice.

Fibers such as meta-aramid fibers and para-aramid fibers may be used as filaments, composite yarn, or spun yarn composed of staple fibers, but in order to achieve both resistance to hole burning in knitted/woven fabrics during flame exposure and practical knitted/woven fabric properties, the content of para-aramid fibers is, as a recommendation, preferably 1 to 70 mass %.

The front fabric layer may be either a single weave fabric or a double weave fabric. Double weave fabrics have more excellent flame exposure resistance and radiant heat exposure resistance for the same basis weight, and double weave fabrics are especially preferred to satisfy requirements for light-weightness and high heat-insulating properties.

In other words, in order to minimize temperature increase at sections corresponding to the skin side when worn, it is considered effective to increase the difference in thickness of the front fabric layer before and after flame exposure, and in the case of a double weave fabric, for example, this is accomplished because fibers with different shrinkage factors are used to form textures on the front and back, and the bundle spacing on the front and back is varied to easily allow variation in thickness.

Figure 1:
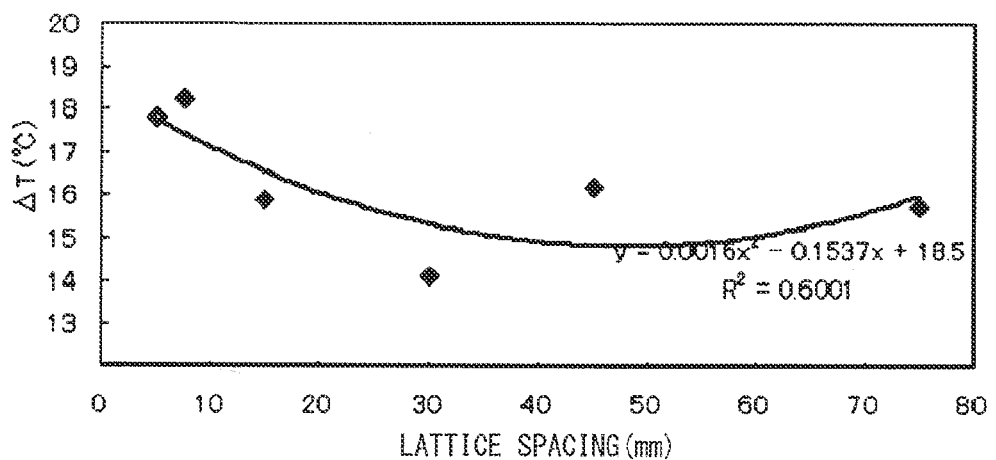
FIG. 1 is a graph showing the relationship between lattice spacing and temperature increase for a double weave fabric composing the front fabric layer of layered heat-proof protective clothing according to the invention.

For example, FIG. 1 shows the relationship between temperature increase ($\Delta T$) on the section corresponding to the skin side, and bundle spacing on the front and back of the front fabric layer, after a lapse of 40 seconds following 8 seconds of flame exposure in a (radiant heat+flame exposure) test (ISO 17492) of the North American Approach B (Section 5) according to ISO 11613, for layered heat-proof protective clothing having the same construction as Example 1 described below, and the graph shows that there is an optimum value of the bundle spacing for inhibition of temperature increase.

Figure 2:
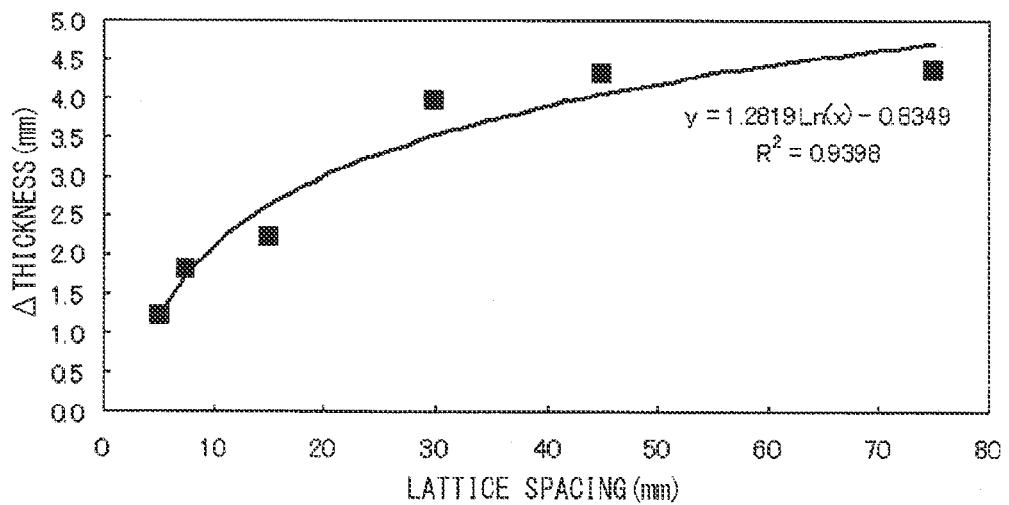
FIG. 2 is a graph showing the relationship between lattice spacing and thickness variation for a double weave fabric composing the front fabric layer of layered heat-proof protective clothing according to the invention.

FIG. 2 shows the relationship between thickness variation of the front fabric layer and bundle spacing on the front and back of the front fabric layer, after a lapse of 40 seconds following 8 seconds of flame exposure under the same conditions described above, and the graph indicates that with a small bundle spacing, despite thickness variation occurring by differential shrinkage of the front and back fabrics, the gain is limited and a sufficient temperature increase-inhibiting effect is not exhibited. If the bundle spacing is too large, however, there is a gain in thickness, but it may not be possible to maintain an effective form for inhibiting temperature increase, and therefore, as with the bundle spacing, there is an optimal value of the thickness for inhibiting temperature increase.

With layered heat-proof protective clothing having the construction described above, the preferred front fabric layer thickness variation is 2 mm or greater (under a 3 $g/cm^2$ load), and the preferred bundle spacing is 15 to 45 mm and more preferably 15 to 30 mm.

Most preferably, the front fabric layer is composed of a double weave fabric, the front fabric layer used having a front side fabric and back side fabric whose TMA shrinkage factor difference at 400° C. (150° C./min increase) is at least 4%, and the variation in thickness of the double weave fabric after 8 seconds of flame exposure from the front side fabric side following ISO 17492 (TPP) being 2 mm or greater.

Also, the double weave fabric of the front fabric layer preferably has higher cut resistance in the back side fabric than the front side fabric.

In order to provide protective clothing with even higher water resistance and chemical resistance, the front fabric layer is preferably treated for water-repellency and oil-repellency, with the treatment method being coating, dipping, spraying, bath immersion or the like.

By using an interlayer which is a woven or knitted fabric mentioned above further subjected to laminating or coating with a breathable waterproof layer film made of polytetrafluoroethylene or the like, it is possible to impart excellent breathable waterproof functioning and chemical resistance.

The interlayer and/or heat-shielding layer with a breathable waterproof function may be either separate or integrated.

A separated 3-layered structure has more interlayer air layers (heat-insulating layers) and is therefore advantageous for the heat-insulating property, but it will likely not exhibit any significantly different heat-insulating property if the layering thickness is the same.

The heat-shielding layer thickness is preferably 1.80 mm or greater, and the basis weight is preferably 110 to 150 g/m².

The heat-shielding layer is preferably obtained by mixing high-shrinkage fibers at 2 to 20%, and exposing the heat-shielding layered structure to wet and dry heat conditions of 80° C. or higher to cause shrinkage, to form a heat-shielding layer with increased thickness (high bulk). In order to obtain a heat-shielding layer of even greater bulk, for example, they are used as warp yarn for a woven fabric (in a design arrangement), so that shrinkage is generated in the warp direction upon exposure to wet and dry heat conditions of 80° C. or higher, and a heat-shielding layer of very high bulk is obtained, or they are alternatingly arranged with non-high-shrinkage fibers to obtain a knitted/woven fabric such as an insulating shock-absorbing material (air packing).

In this case, in order to maintain pressure resistance/form retention (during washing and wearing) in the direction of thickness (bulk), for example, when an insulating shock-absorbing material (air packing) is to be obtained, a high effect is obtained by single/double alternating arrangement or arrangement in a bordered or striped fashion in the knitted/woven fabric. For a bordered pattern (single/double alternating arrangement), it is very useful for shrinkage-resistant or non-shrinkage fibers to occupy the front side of the double sections, with a greater percentage on the front side of the double section than on the back side (for example, front:back ratio of 2:1), in order to exhibit a stable and durable thickness.

Figure 3:
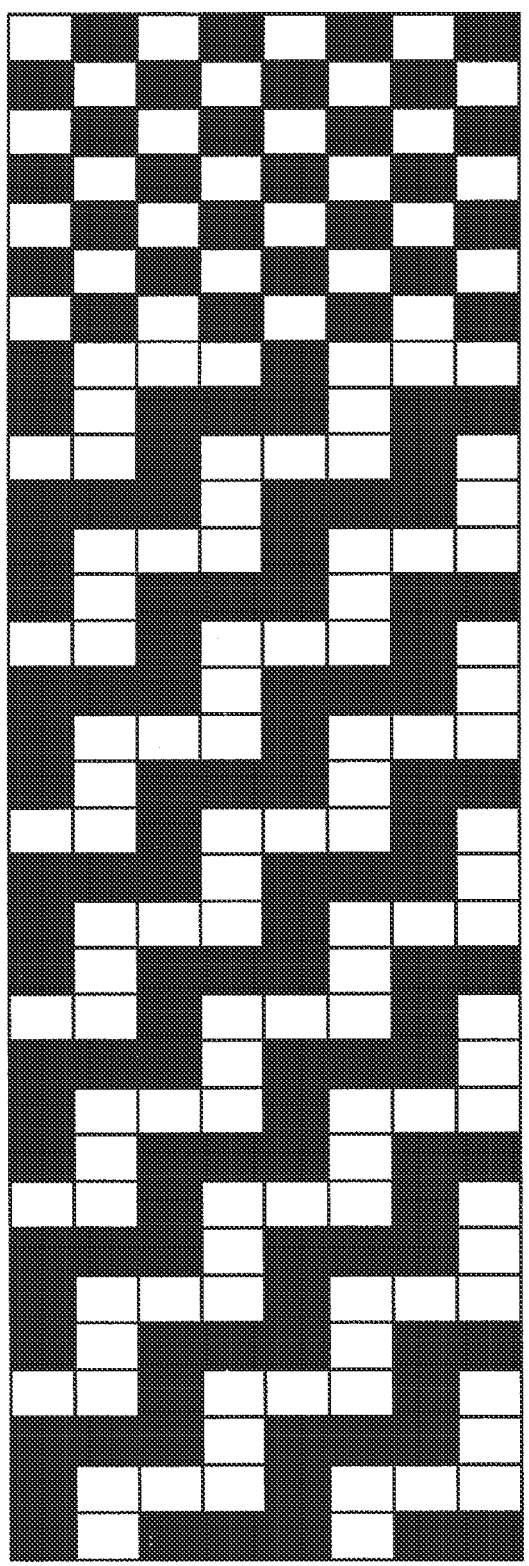
FIG. 3 is a weave diagram showing an example of a woven fabric composing the heat-shielding layer of layered heat-proof protective clothing according to the invention.
Figure 4:
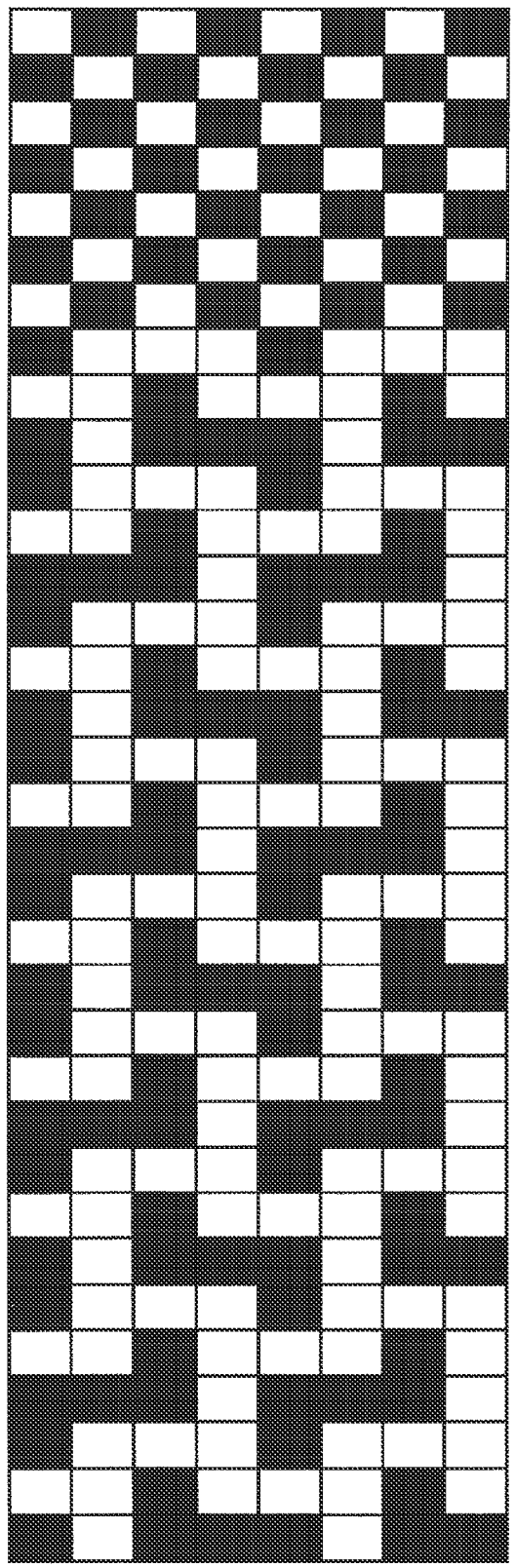
FIG. 4 is a weave diagram showing another example of a woven fabric composing the heat-shielding layer of layered heat-proof protective clothing according to the invention.
Figures 1, 5:
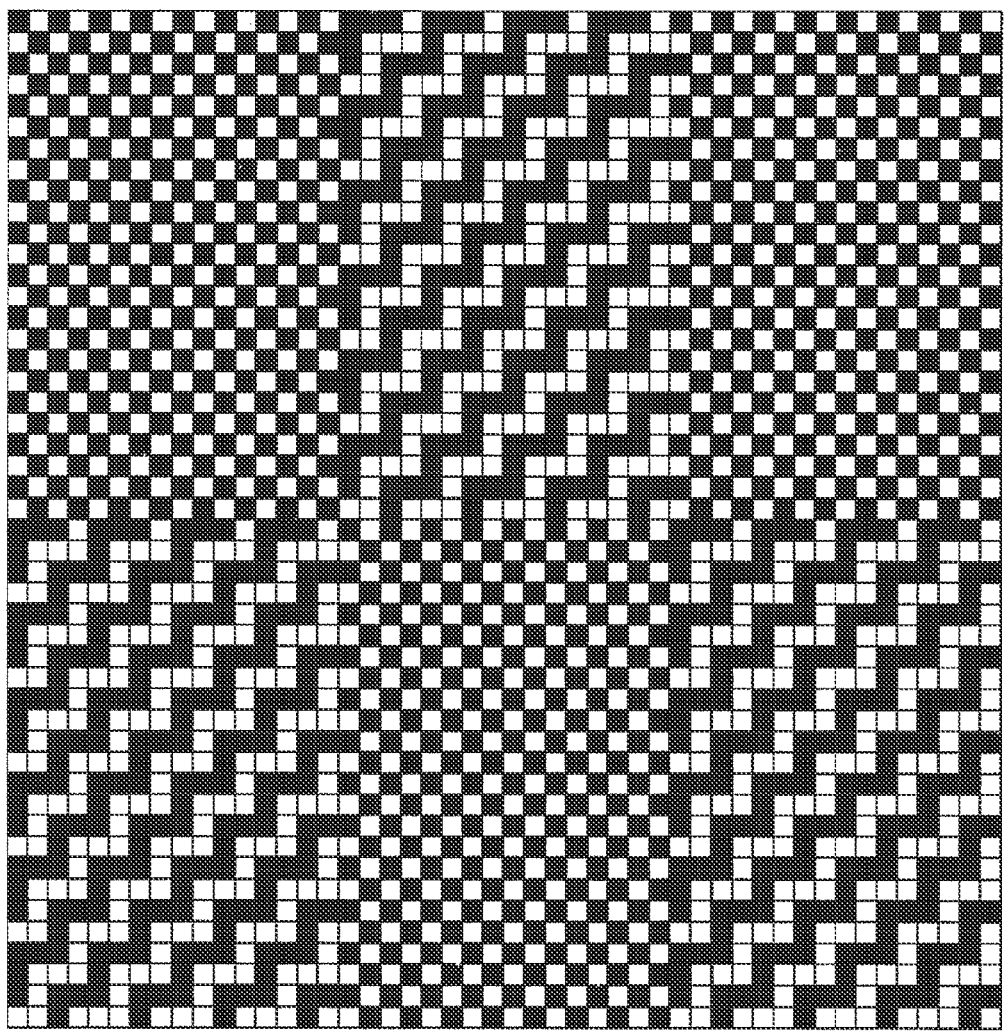
Figures 2, 5:
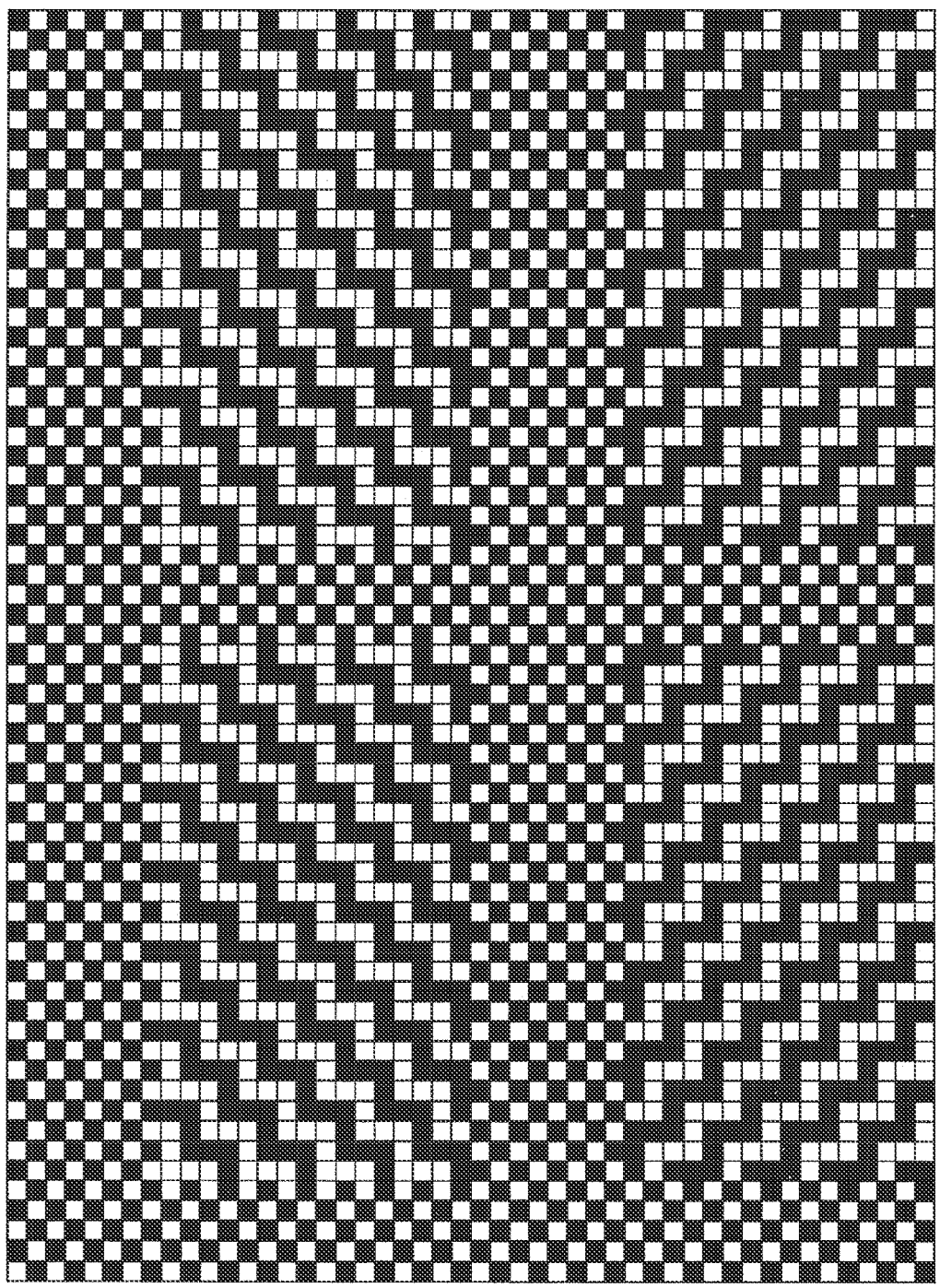
Figures 3, 5:
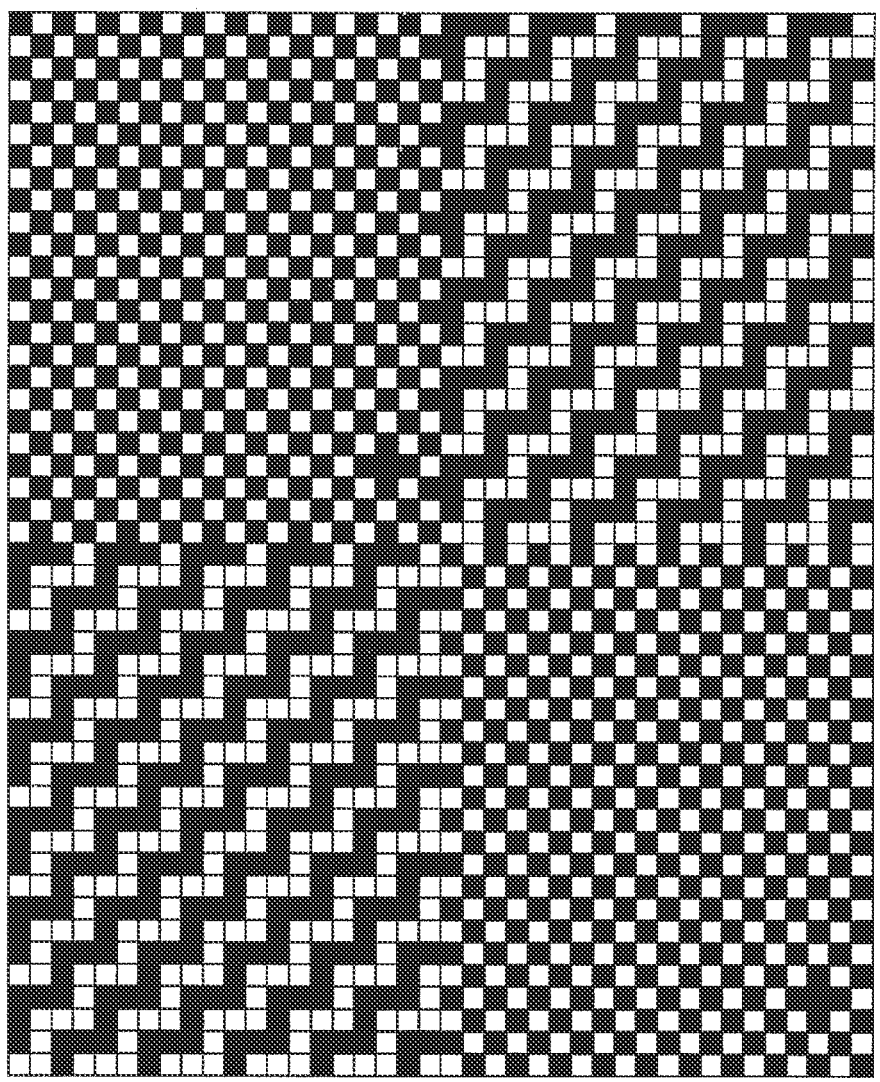
Figures 4, 5:
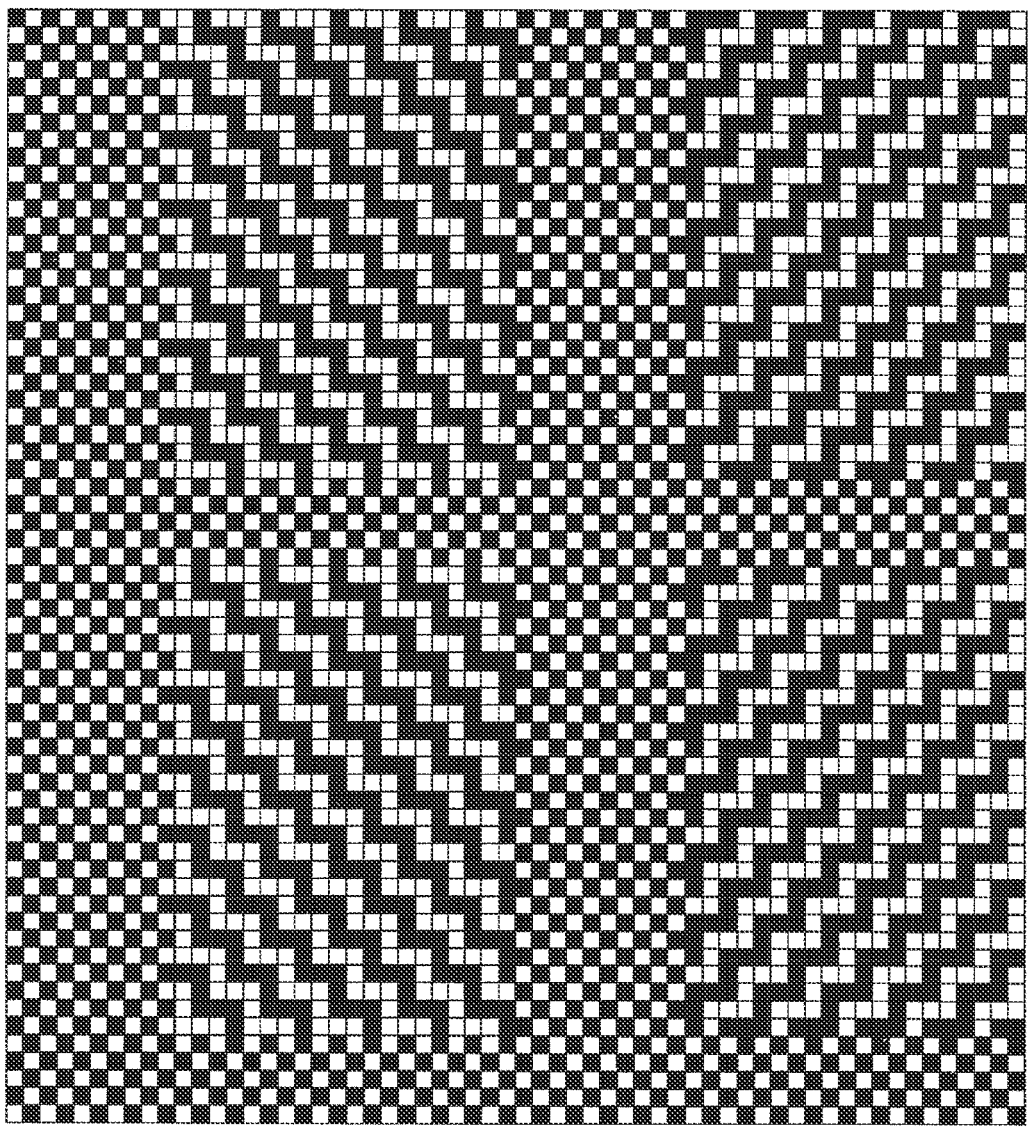
Figure 5:
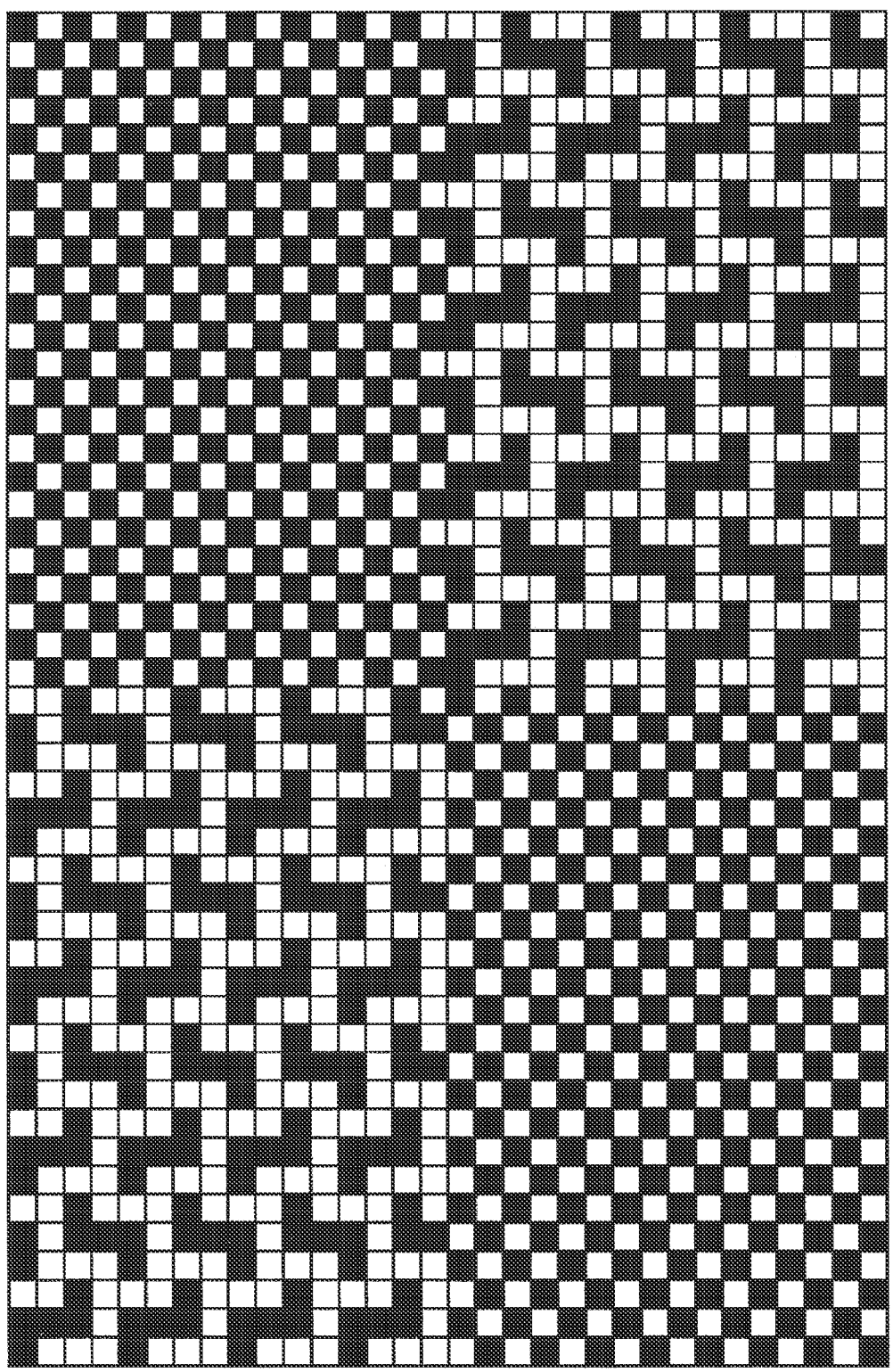

Examples of design drawings for such a woven texture are shown in FIG. 3 to FIG. 5. FIG. 5 shows an example of an alternating arrangement, and the density and alternating pitch may be varied to freely vary the thickness or the thickness durability.

When a heat-shielding layer obtained in this manner is to be used in layered heat-proof protective clothing, either the front or back may be used as the flame side (or the wearing (body) side), but considering that the fireproof piece of the layered heat-proof protective clothing is to be worn, it is important that it not be hooked by toe tips or roughened fingertips, in which case the wearing (body) side is preferably the side with fewer irregularities; however, this is not a limitation if a high heat-insulating property is the priority, and irregularities (random, alternating or on one side) such as found in insulating shock-absorbing materials (air packings) may be present either on the front or back.

Figures 5, 6:
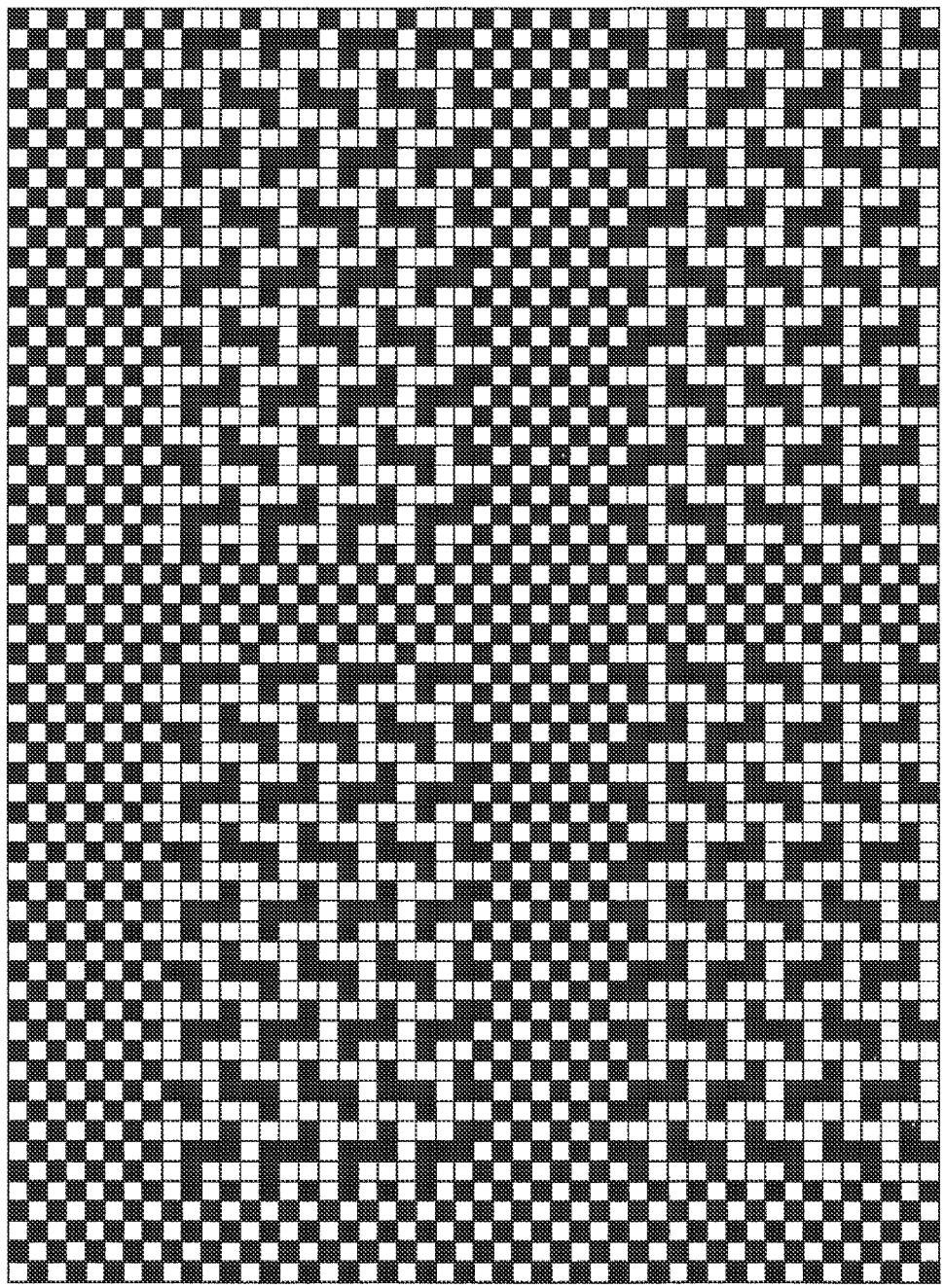
Figures 5, 6, 7:
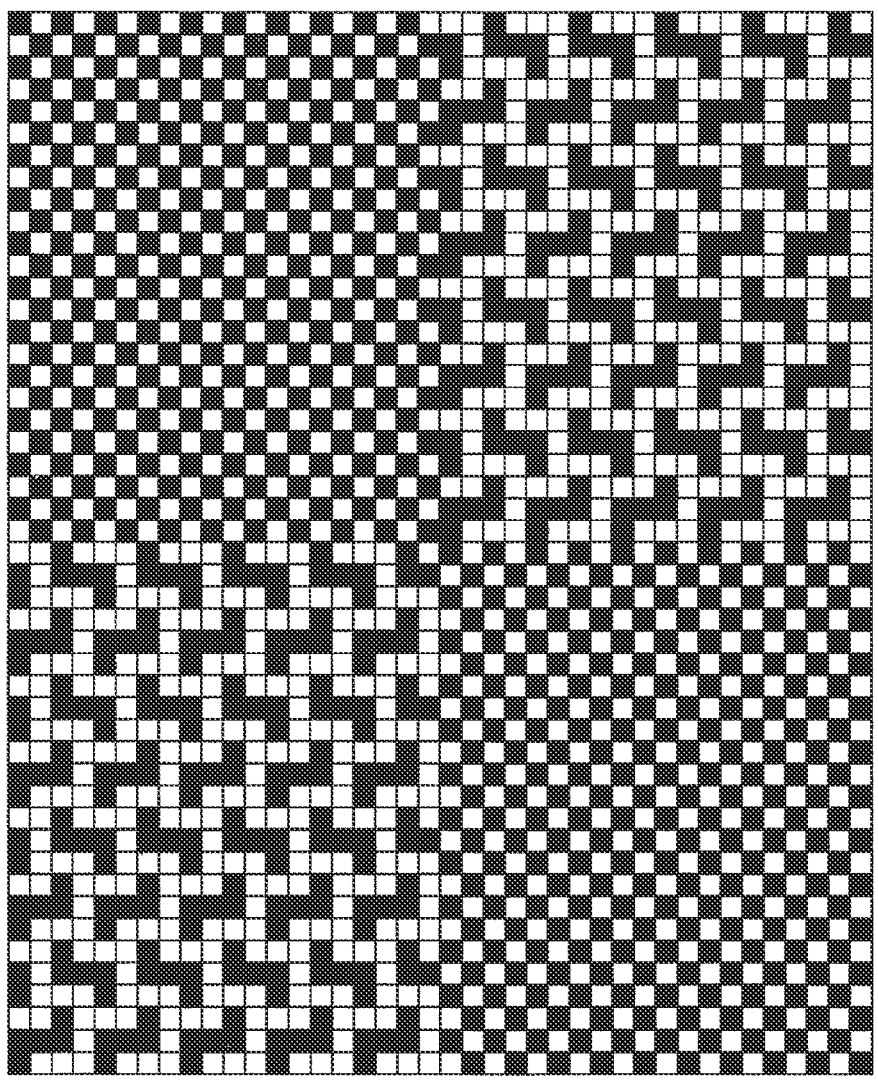
Figures 5, 6, 7, 8:
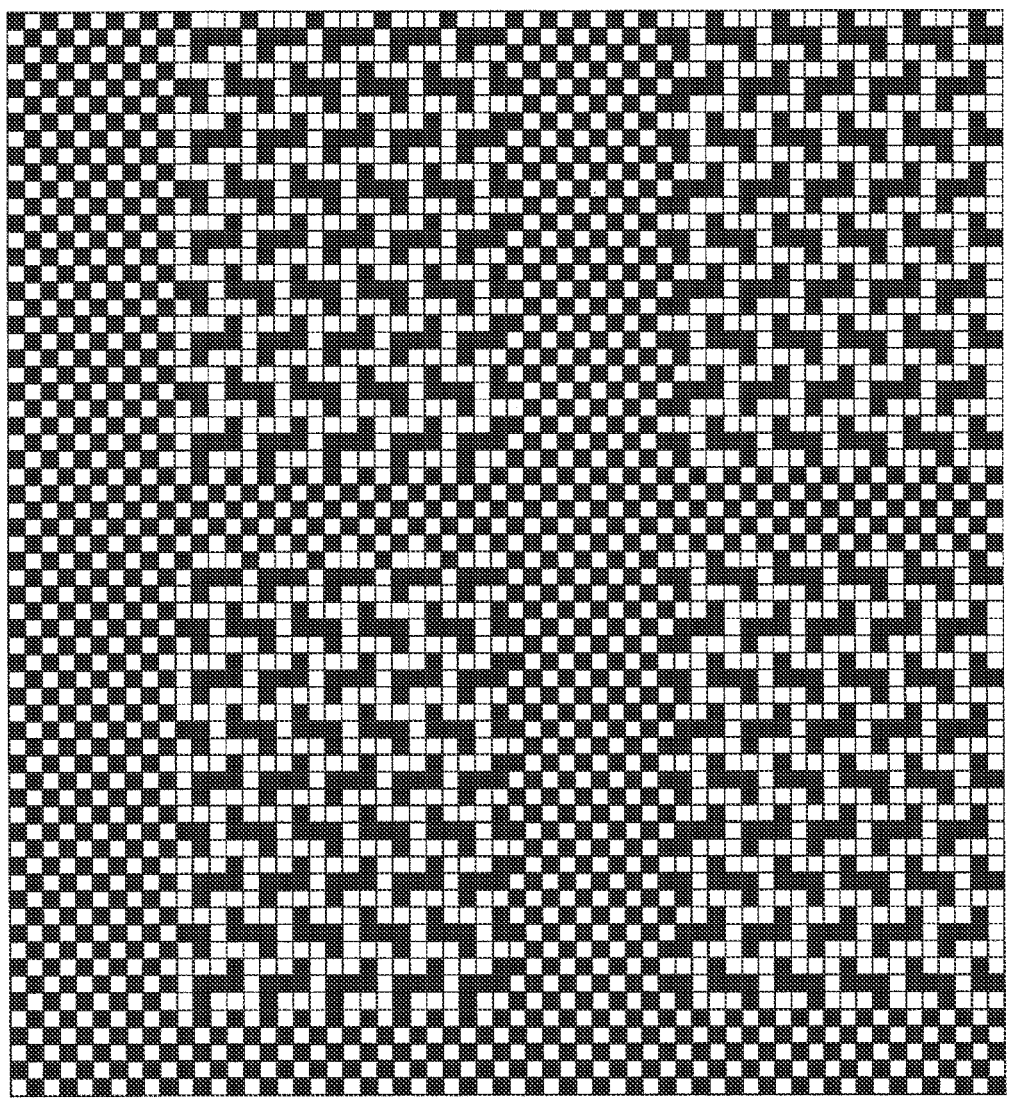
Figure 6:
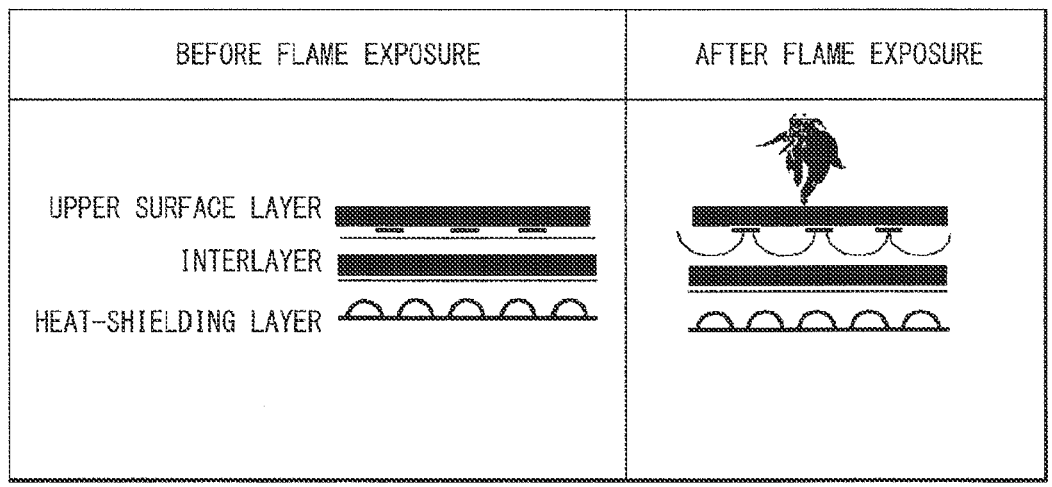

The layered heat-proof protective clothing of the invention undergoes an alteration in cross-sectional form as shown in FIG. 6, before and after flame exposure, and exhibits the excellent heat resistance described below.

Specifically, the layered heat-proof protective clothing of the invention must have a thickness of 2.5 mm or greater after 5 washings according to ISO 6330, and a time to temperature increase by 24° C. (RHTI24) of 18 seconds or longer in a heat transfer (radiant heat exposure) test (ISO 6942-2002) in European Approach A (Section 4) according to ISO 11613.

If the time to temperature increase by 24° C. (RHTI24) in the radiant heat exposure test (ISO 6942-2002) is not within this range it may not be possible to obtain an adequate heat-insulating property, the weight of the protective clothing may be excessively increased, and it may not be possible to reduce heat stress.

The following properties are also preferred according to the invention.

(1) A time to temperature increase by 24° C. (HTI24) of 13 seconds or longer in a heat transfer (flame exposure) test (ISO 9151) in European Approach A (Section 4) according to ISO 11613.

(2) A difference of at least 4 seconds between the time to temperature increase by 24° C. (RHTI24) and the time to temperature increase by 12° C. (RHTI12), in a heat transfer (flame exposure) test (ISO 9151) in European Approach A (Section 4) according to ISO 11613.

(3) A time to temperature increase by 24° C. (TPP) of at least 17.5 seconds in a (radiant heat+flame exposure) test (ISO 17492) in North American Approach B (Section 5) according to ISO 11613.

The layered heat-proof protective clothing of the invention obtained in this manner preferably has a basis weight of 400 to 600 g/m², and more preferably 450±50 g/m².

The layered heat-proof protective clothing of the invention also preferably has a 2nd+3rd degree burn rate of no greater than 10%, according to ISO 13506.

EXAMPLES

The invention will now be explained in greater detail by the following examples. The evaluation methods used in the examples were the following.
(1) ISO 6942-2002: RHTI24 (sec)

The time to 24° C. increase (RHTI24) of a copper sensor after initiating radiant heat exposure with heat flux of 40 kW/m² was determined according to ISO 6942 (2002).
(2) ISO 9151: HTI24 (sec)

The time to 24° C. increase (HTI24) of a copper sensor after initiating flame exposure was determined according to ISO 9151.
(3) ISO 17492: TPP Time (sec)

The time to 24° C. increase (second degree burn) (TPP time (sec)) after start of testing was determined according to ISO 17492.
(4) ISO 13506: 2nd+3rd Degree Burn Rate (%)

The 2nd+3rd degree burn rate was calculated according to ISO13506. In this case, however, the head protector was not worn, and therefore measurement and calculation was performed only for the body without the head. For the evaluation, 100% cotton upper and lower body underwear and uniform slacks were donned first, and then the heat-proof protective clothing was worn and the test was conducted.
(5) Thickness (mm)

Washing was conducted 5 times according to ISO 6330, and the front fabric layer and the interlayer and/or heat-shielding layer were layered. The thickness was then measured under 3 g/cm² according to JISL1018 (pilose fabrics).

Example 1

The front fabric layer was a two-layer structure woven fabric, using on the front side of the two-layer structure a spun yarn comprising polymetaphenylene isophthalamide fiber (product of Teijin Techno Products Co., Ltd., Teijin Conex, mass-colored filament grade, c/#NB32.2T51) and coparaphenylene 3,4'-oxydiphenylene terephthalamide fiber (product of Teijin Techno Products Co., Ltd., Technora, grade: T330BK1.7T51) (blending ratio: meta 90:para 10, yarn count: 40/1).

On the back side there was used spun yarn composed of coparaphenylene 3,4'-oxydiphenylene terephthalamide fiber (product of Teijin Techno Products Co., Ltd., Technora, grade: T330BK1.7T51), and for the front and back bundles, there was used on the front side, spun yarn comprising metaphenylene isophthalamide fiber (product of Teijin Techno Products Co., Ltd., Teijin Conex, mass-colored filament grade, c/#NB32.2T51) and coparaphenylene 3,4'-oxydiphenylene terephthalamide fiber (product of Teijin Techno Products Co., Ltd., Technora, grade: T330BK1.7T51), bundled with a lattice spacing of 15 mm, and weaving with a warp×weft density of 96×86/inch.

The obtained greige was subjected to singeing, desizing scouring and water-repellent/oil-repellent treatment, by common processes. The basis weight of the obtained fabric was 215 g/cm², and the thickness was 0.80 mm (JISL1018).

For the interlayer there was used spun yarn comprising polymetaphenylene isophthalamide fiber (product of Teijin Techno Products Co., Ltd., Teijin Conex, mass-colored filament grade, c/#NB32.2T51) and coparaphenylene 3,4'-oxydiphenylene terephthalamide fiber (product of Teijin Techno Products Co., Ltd., Technora, grade: T330BK1.7T51) (blending ratio: meta 95:para 5, yarn count: 40/1), and after weaving and finish cutting by common methods, a polytetrafluoroethylene breathable waterproofness film (product of Japan Goretex Co., Ltd.) was laminated therewith to obtain a breathable waterproof layer with a basis weight of 120 g/cm².

For the heat-shielding layer there was used spun yarn comprising polymetaphenylene isophthalamide fiber (product of Teijin Techno Products Co., Ltd., Teijin Conex, mass-colored filament grade, c/#NB32.2T51) and coparaphenylene 3,4'-oxydiphenylene terephthalamide fiber (product of Teijin Techno Products Co., Ltd., Technora, grade: T330BK1.7T51) (blending ratio: meta 95:para 5, yarn count: 40/1), and doubled yarn of this spun yarn with polyester filaments with a BWS of 30% (product of Teijin Fibers, Ltd., grade: TFYN301 SDC33T12) was arranged in an alternating fashion as warp yarn, with spun yarn as the weft yarn, and weaving at 88 warp/inch, 90 weft/inch in the pattern shown in FIG. 3, followed by desizing scouring and finish cutting, to obtain a heat-shielding layer with a basis weight of 129 g/cm² and a thickness of 2.1 mm (JISL1018).

The obtained front fabric layer, interlayer and heat-shielding layer were washed 5 times, the thickness of the three layers was measured, and then the heat-insulating and other properties were evaluated. The results are shown in Table 1.

Example 2

The procedure was carried out in the same manner as Example 1, except for using spunize filaments of coparaphenylene 3,4'-oxydiphenylene terephthalamide fiber (product of Teijin Techno Products Co., Ltd., Technora, grade: GTN220T) for the back side of the front fabric layer in Example 1.

Example 3

The procedure was carried out in the same manner as Example 2, except that the weaving density of the front fabric layer in Example 2 was changed to a warp×weft density of 96×94/inch.

Example 4

The procedure was carried out in the same manner as Example 1, except that the spun yarn count on the front side of the front fabric layer in Example 1 was changed to 36/1.

Example 5

The procedure was carried out in the same manner as Example 1, except that the texture of the heat-shielding layer in Example 1 was changed to the design shown in FIG. 4.

Example 6

The procedure was carried out in the same manner as Example 1, except that the heat-shielding layer in Example 1 was changed to two attached single layers.

Example 7

The procedure was carried out in the same manner as Example 1, except that the lattice spacing between front and back bundles of the front fabric layer in Example 1 was changed to 30 mm.

Comparative Example 1

The procedure was carried out in the same manner as Example 1, except that the thickness of the heat-shielding layer in Example 1 was changed to 1.27 mm, and the thickness of the 3 layers was changed to 2.4 mm.

TABLE 1

|  |  | Examples | | | | | | | Comparative Example |
|---|---|---|---|---|---|---|---|---|---|
|  |  | 1 | 2 | 3 | 4 | 5 | 6 | 7 | 1 |
| Protective clothing thickness | (mm) | 3.456 | 3.318 | 3.358 | 3.236 | 3.489 | 5.496 | 3.384 | 2.635 |
| Protective clothing basis weight | g/m² | 464 | 430 | 482 | 470 | 466 | 593 | 467 | 500 |
| Heat-shielding layer thickness | (mm) | 2.1 | 2.1 | 2.1 | 2.1 | 2.4 | 4.2 | 2.1 | 1.3 |
| Heat-shielding layer basis weight | g/m² | 129 | 127 | 129 | 129 | 131 | 258 | 129 | 126 |
| ISO6942 | RHTI24 (sec) | 20.4 | 18.1 | 19.7 | 20.1 | 18.1 | 27.5 | 20.6 | 16.2 |
| ISO9151 | HTI24 (sec) | 19.0 | 17.4 | 18.2 | 18.0 | 17.4 | 24.0 | 17.8 | 14.8 |
|  | HTI24-12 (sec) | 4.9 | 4.8 | 4.7 | 4.6 | 4.8 | 6.0 | 4.7 | 4.3 |
| ISO17492 | TPP (sec) | 17.9 | 16.9 | 18.0 | 17.5 | 16.9 | 19.0 | 17.9 | 13.9 |
| ISO13506 | (%) | 3.7 | 5.8 | 5.2 | 7.1 | 5.8 | 0.5 | 2.5 | 16.1 |

What is claimed is:

1. Layered heat-proof protective clothing comprising a front fabric layer, and a breathable waterproof interlayer and/or heat-shielding layer, the layered heat-proof protective clothing having a thickness of 2.5 mm or greater after 5 washings according to ISO 6330,and a time to temperature increase by 24° C. RHTI24 of 18 seconds or longer in a heat transfer radiant heat exposure test ISO 6942-2002 in European Approach A Section 4 according to ISO 11613,
   wherein the basis weight of the layered heat-proof protective clothing is 450±50g/m², and
   wherein the front fabric layer is composed of a double weave fabric, having a front side fabric and back side fabric whose TMA shrinkage factor difference at 400° C. 150° C/min increase is at least 4 %, and the variation in thickness of the double weave fabric after 8 seconds of flame exposure from the front side fabric side following ISO 17492 TPP being 2 mm or greater.

2. Layered heat-proof protective clothing according to claim 1, wherein the time to temperature increase by 24° C. HTI24 is 13 seconds or longer in a heat transfer flame exposure test ISO 9151 in European Approach A Section 4 according to ISO 11613.

3. The layered heat-proof protective clothing according to claim 1, which has a difference of at least 4 seconds between the time to temperature increase by 24° C. HTI24 and the time to temperature increase by 12° C. HTI12, in a heat transfer flame exposure test ISO 9151 in European Approach A Section 4 according to ISO 11613.

4. The layered heat-proof protective clothing according to claim 1, wherein the time to temperature increase by 24° C. TPP is at least 17.5seconds in a radiant heat +flame exposure test ISO 17492 in North American Approach B Section 5according to ISO 11613.

5. The layered heat-proof protective clothing according to claim 1, wherein the basis weight of the layered heat-proof protective clothing is 400 to-482 g/m².

6. The layered heat-proof protective clothing according to claim 1, wherein the thickness of the heat-shielding layer is 1.80 mm or greater.

7. The layered heat-proof protective clothing according to claim 1, wherein the basis weight of the heat-shielding layer is 110 to 150 g/m².

8. The layered heat-proof protective clothing according to claim 1, wherein the layered heat-proof protective clothing has a 2nd +3rd degree burn rate of no greater than 10% according to ISO 13506.

9. The layered heat-proof protective clothing according to claim 1, wherein the double weave fabric of the front fabric layer has higher cut resistance for the back side fabric than the front side fabric.

10. The layered heat-proof protective clothing according to claim 1, wherein the heat-shielding layer has a basis weight of 100 to 150 g/m², and high-shrinkage fibers with a BWS of 10-50% are used at 2-20%.

11. The layered heat-proof protective clothing according to claim 1, wherein the heat-shielding layer is a fancy double weave fabric.

12. The layered heat-proof protective clothing according to claim 2, which has a difference of at least 4seconds between the time to temperature increase by 24° C. HTI24 and the time to temperature increase by 12° C. HTI12, in a heat transfer flame exposure test ISO 9151in European Approach A Section 4 according to ISO 11613.

* * * * *